Aug. 24, 1965

D. B. JAMES 3,202,983

MULTIDIODE COINCIDENCE DETECTOR

Filed Dec. 8, 1960

INVENTOR
D. B. JAMES
BY Harry C. Hart
ATTORNEY

United States Patent Office 3,202,983
Patented Aug. 24, 1965

3,202,983

MULTIDIODE COINCIDENCE DETECTOR

Dennis B. James, Bernardsville, N.J., assignor to Bell Telephone Laboratories, Incorporated, New York, N.Y., a corporation of New York Filed Dec. 8, 1960, Ser. No. 74,714
12 Claims. (Cl. 340—347)

Figure 1:
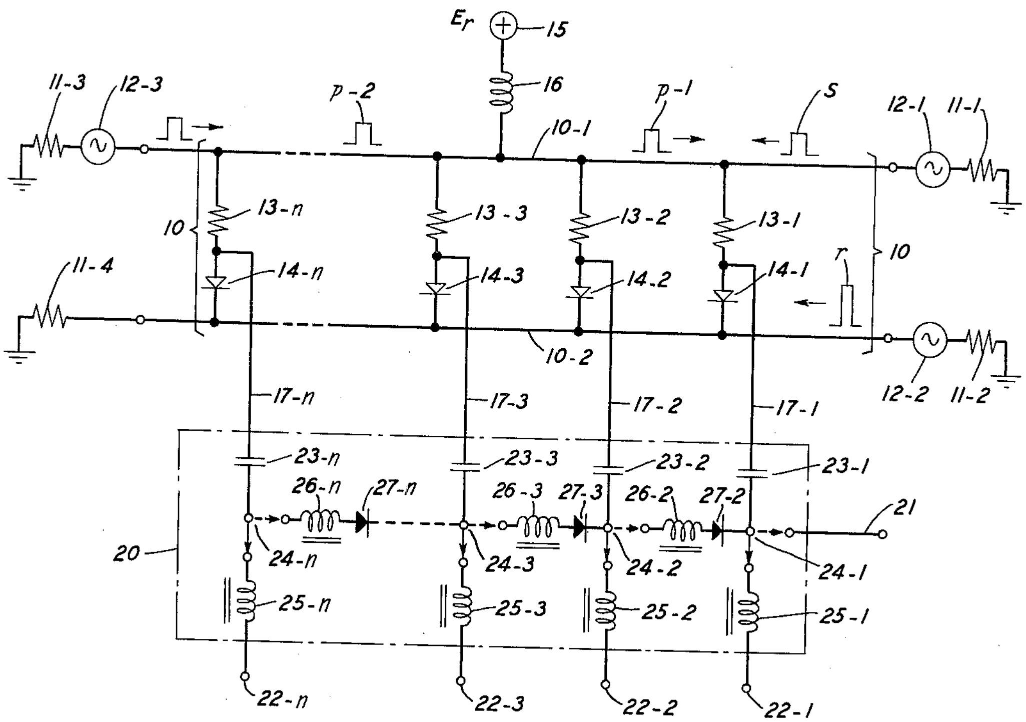

This invention relates to coincidence detection and more particularly to the application of such detection to the conversion of encoded information signals by the employment of negative resistance diodes.

Although an information signal generally originates as a continuous message wave, it is often advantageous to encode it by sampling the wave and transforming the samples into trains of pulse signals. For a given train the constituent pulse signals may be taken in time sequence on a single path, in which case the sampled information signal is said to be serially encoded, or the pulse signals may be taken simultaneously on separate paths, in which case the sampled information signal is said to be parallel encoded. Once encoded, the information signal is subjected to processing. This may require a code conversion from serial to parallel form. Or, it may involve a speed conversion from one pulse rate to another. On occasion it entails time conversion for which the code signals are held in storage for a prescribed delay interval. Accordingly, it is an object of the invention to facilitate the accomplishment of the above mentioned conversions. A concurrent object is the realization of all such conversions in a single device.

Typically, the conversions have required tandem connected stages which, commencing with the first stage, are successively "set" by serial code signals with information states that are sequentially shifted to succeeding stages. Under these circumstances, the rate at which the code signals can be accommodated by the stages depends upon the rate at which shifting can take place. Consequently, it is a further object of the invention to eliminate the need for shifting by having each pulse signal of the train act upon but a single stage. A related object is to use the time intervals between the occurrence of the individual pulse signals for directing each of those signals to its appropriate stage which is constituted of a negative resistance diode.

The invention is characterized by the employment of a transmission path whose conductors are interconnected at prescribed intervals by negative resistance diodes. The diodes are so biased that each is capable of adopting any one of at least two distinctive signal states. Initially, all of the diodes are set with a like one of their signal states, for example, their low signal states, and input signals of appropriate polarity are applied at one extremity of the path. At least one setting pulse signal of the same polarity is applied to the other extremity of the path. The diverse signals then propagate in opposite directions along the path. Whenever oppositely propagating ones of the signals coincide at the position of a diode, that diode is switched to its high signal state to indicate a change in its information state. After the desired coincidences have been registered, the diodes so affected are returned to their low signal states by a propagated "resetting" pulse signal, which may be of opposite polarity from that used in setting. When the input signals represent serially encoded samples, the outputs of the diodes, taken through a conversion network, are either in the form of parallel converted pulse signals or serial pulse signals that have been speed- or time-converted.

Figure 2:
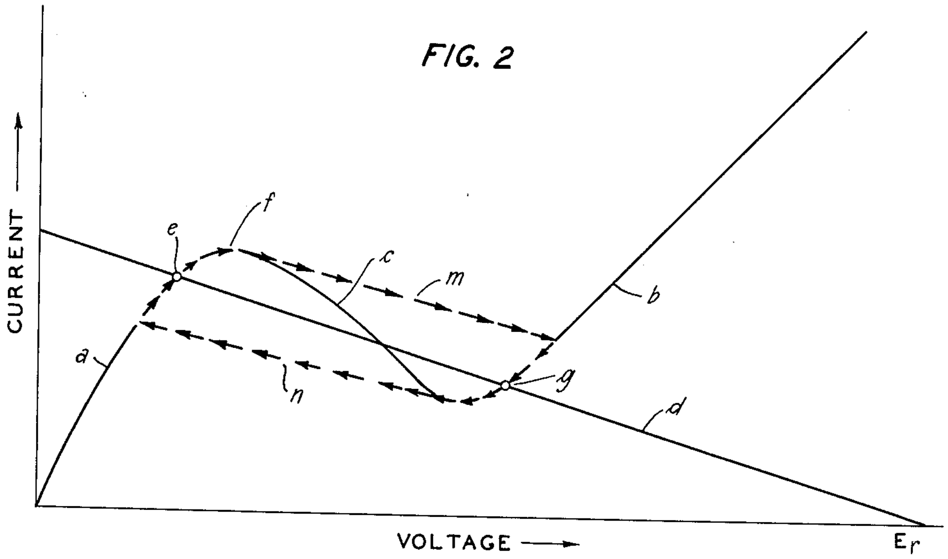

The accomplishment of the above and related objects will be apparent after the consideration of an illustrative embodiment of the invention taken in conjunction with the drawings in which:

FIG. 1 is a schematic circuit diagram showing a coincidence detector employing a multiplicity of negative resistance diodes; and FIG. 2 is a current voltage characteristic of a single diode employed in the detector of FIG. 1 and explanatory of the way in which coincidence detection takes place according to the invention.

Turn now to FIG. 1 showing a dual conductor transmission path 10 of a coincidence detector. At its left- and right-hand extremities, the path 10 is matched in its characteristic impedance by the composite effect of terminating resistors 11–1 through 11–4. Also included at the extremities are various sources 12–1 through 12–3 of pulse signals. Along the path 10 and at each of a number of positions that are equally spaced for convenience the conductors 10–1 and 10–2 are interconnected by the series combination of a biasing resistor 13 and a voltage-controlled negative resistance diode 14. The diodes 14–1 through **14–*n* are collectively biased by a positive-polarity voltage $E_r$ which is provided by a signal source 15 that is connected to one of the path conductors, namely, conductor 10–1, through a coupling inductor 16. Individual leads 17–1 through 17–*n* link the anodes of the several diodes 14–1 through 14–*n* to a converter network 20 which has a series output 21 for speed- and time-converted signals and parallel outputs 22–1 through 22–*n* for code converted signals. The parallel outputs 22–1 through 22–*n* terminate extensions of the individual leads 17–1 through 17–*n*. Each extension path advantageously includes a differentiating capacitor 23, a converter switch 24 and a delay element 25. The series output 21 terminates a path that advantageously encompasses all of the switches 24–1 through 24–*n*, as interconnected in successive pairs by a variable delay element 26 in series connection with a rectifying diode 27**.

To understand the operation of the coincidence detector, refer to the current voltage characteristic in FIG. 2 of a representative voltage-controlled diode 14 in FIG. 1. The characteristic displays first and second regions *a* and *b* of positive resistance and an intervening region *c* of negative resistance. Also depicted in FIG. 2 is the load line *d* attributable to the biasing resistor 13 associated with the representative diode 14. The load line *d*, whose slope is the reciprocal of the resistive magnitude of the biasing resistor 13 and whose abscissal location is given by the magnitude of the reference voltage $E_r$, is adjusted until it intersects the diode characteristc in both the first region *a* and the second region *b* of positive resistance. For this condition the diode 14 is said to be biased for bistable operation. Initially each diode 14 of the detector in FIG. 1 is in its equilibrium low voltage state determined by the intersection *e* of the load line *d* with the first region *a* of positive resistance. This intersection *e* is chosen to be sufficiently far below the threshold *f* terminating the first region *a* of positive resistance that the concurrence of two pulse signals is required and suffices to shift the load line *d* beyond the threshold *f* and thus cause the diode 14 to assume its equilibrium high voltage state determined by the intersection *g* of the load line *d* with the second region *b* of positive resistance.

Assume that the source 12–3 at the left-hand extremity of the path 10 in FIG. 1 applies serially coded pulses to the first conductor 10–1. Then setting requires the propagation of pulse signals from the opposite extremity of the path 10. These setting pulse signals are of like polarity with the code pulse signals if they originate at the source 12–1 connected to the first conductor 10–1, or, they are of opposite polarity if they originate at the source 12–2 connected to the second conductor 10–2. As a result, oppositely propagating pulses begin to traverse the transmission path 10 and, although they become attenuated during the traversal, for all practical purposes with a short line, for which the attenuation is approximately linear, the composite pulse amplitude for each coincidence condition is the same regardless of the position along the line where coincidence takes place, with the consequence that the load line adjustments are substantially identical for all diodes 14.

Since the code signals traverse the path 10 with a given velocity $v$, determined in the well-known fashion for transmission lines, the spacing between successive pairs of diodes 14–1 through 14–$n$ is advantageously one-half of the product of the velocity $v$ and the interval $t$ between repetitions of the pulse signals. In this way pulse signals originating, for example, at the setting source 12–1 are able to set each diode 14 in turn.

Assume that the setting source 12–1 is activated by or synchronized with the first pulse signal $p$–1 of the train of pulses occupying at least first and second code positions and emanating from the pulse source 12–3 in FIG. 1. Then the first pulse signal $p$–1 and the setting pulse signal $s$ arrive at the last diode 14–1 simultaneously. At that instant the second pulse signal $p$–2 of the train reaches the second from the last diode 14–3, so that by the time the second pulse signal $p$–2 has travelled to the position of the next to the last diode 14–2, the setting pulse signal $s$ is coincident with it. For each diode 14 at the position of a coincidence there is a change in signal state that follows a locus $m$ of increasing voltage shown in FIG. 2. Since the change in signal state is a transient effect, the increasing voltage locus $m$ has a slope which is governed by the transient impedance seen from the position of the diode 14. That impedance is but slightly greater than that of each biasing resistor 13 with the result that the locus $m$ substantially parallels the load line $d$. Thus, a complete traversal of the path 10 by the setting pulse $s$ results in the storage of information states in the successive diodes 14–1 through 14–$n$ according to the encoding of the pulse train emanating from the pulse source 12–3.

The change in signal state caused by each coincidence is prevented from affecting the reference voltage source 15 by the isolation afforded by the coupling inductor 16. Reverse propagation is prevented through the selection of the biasing impedance resistive magnitudes to be substantially greater than the characteristic impedance of the path.

Detection of the stored information states is accomplished through the propagation of a resetting pulse signal $r$ which, when it originates at the second signal source 12–2, is of like polarity at the setting pulse signal $s$. Its magnitude is sufficiently great to overcome the attenuation of the path 10 so that the diode operation follows the decreasing voltage locus $n$ of FIG. 2, even at the left-hand extremity of the path 10. Alternatively the resetting pulse signal may be of the opposite polarity from that used for setting, in which case it is applied to the first conductor 10–1 of the line.

For serial to parallel conversion the converted signals advantageously occur simultaneously at the parallel outputs 22–1 through 22–$n$ of the converter network 20. The appropriate time delay required to compensate for the time required for the traversal of the resetting pulse signal $r$ is obtained by adjusting the delay elements 25–1 through 25–$n$ of the parallel paths. In order that the outputs 22–1 through 22–$n$ be in the form of pulse signals, the capacitors 23–1 through 23–$n$ act in concert with the characteristic impedances of the paths to differentiate the changes in signal level associated with changes in information state.

To obtain a speed- or time-converted set of signals at the serial output 21 of the converter network 20, the converter switches 24–1 through 24–$n$ are set to establish a continuous path that in effect taps the anodes of the various diodes 14–1 through 14–$n$. The delay times of the several delay elements 26–1 through 26–$n$ are adjusted according to the rate at which the time-converted pulse signals are to appear at the serial output 21. When the time delay accorded by the first such element 26–2 is equal to the propagation time between the last diode 14–1 and the last but one 14–2, the converted signals appearing at the serial output 21 occur at the same rate as they are stored in the first place. By changing the delay time the rate can be increased or decreased accordingly. Besides serving the differentiating function already discussed in conjunction with the parallel path, the capacitors 23–1 through 23–$n$ also serve to isolate succeeding and preceding diode stages from each other.

It is also apparent that the converter may be used to establish differences in the times of origin of diverse pulse signals by noting which one of the diodes 14–1 through 14–$n$ is caused to change state when oppositely propagated pulse signals are applied to the transmission path 10. Other uses of the converter and techniques for energizing, monitoring and biasing the path 10 will occur to those skilled in the art.

What is claimed is:

1. Apparatus for detecting the coincidences of diverse pulse signals, which comprises a transmission path having two opposite extermities and capable of propagating pulse signals from either extremity to the opposite extremity, means for applying a first group of the pulse signals to one extremity of said path, means for applying a second group of the pulse signals to the other extremity of said path, a plurality of bistate diode means, each characterized by a first signal state and a second signal state and each being affixed to said path at a distinct one of various positions therealong, and means coupled to said path for biasing all of said bistate means to their fist signal states and so proportioned that simultaneous concurrences of pulse signals from said first and second groups at said various positions cause the bistate means there positioned to adopt their second signal states.

2. Apparatus for detecting the coincidences of diverse pulse signals, which comprises a transmission path having two opposite extremities and capable of propagating pulse signals from either extremity to the opposite extremity, means for applying a first group of the pulse signals to one extremity of said path, means for applying a second group of the pulse signals to the other extremity of said path, a plurality of bistate diode means, each characterized by a first signal state and a second signal state and each being affixed to said path at a distinct one of various positions therealong, means coupled to said path for biasing all of said bistate means to their first signal states and so proportioned that simultaneous concurrences of pulse signals from said first and second groups at said various positions cause the bistate means there positioned to adopt their second signal states, and means for applying, at an extremity of said path, a third group of pulse signals, whereby the various ones of said bistate means having adopted said second signal states are returned to their first signal states.

3. Apparatus as defined in claim 2, further including means for converting the signal states adopted by said bistate means into simultaneously occurring pulse signals which appear on distinctive output leads, thereby to derive a parallel encoded counterpart of serially encoded pulse signals applied at one of the extremities of said path.

4. Apparatus as defined in claim 2, further including means, with a separate connection to each of said bistate means, for converting signal states adopted by said bistate means into a sequence of pulse signals appearing on a distinctive output lead thereby to derive the delayed counterpart of serially encoded pulse signals applied at one of the extremities of said path.

5. Apparatus as defined in claim 1, wherein said bistate means comprises a negative resistance means and loading means connected in series therewith.

6. Apparatus as defined in claim 5, wherein said negative resistance means comprises a voltage-controlled negative resistance diode and said loading means comprises a resistor.

7. Apparatus as defined in claim 3, wherein said conversion means comprises means for individually differentiating the signal levels associated with said adopted signal states to obtain distinctive pulse signals, and means for delaying the pulse signals thus obtained.

8. Apparatus as defined in claim 4, wherein said conversion means comprises means for individually differentiating the signal levels associated with said adopted signal states, a multisegmented output path, each segment of said path including delay means and means for inhibiting back propagation, and means connecting successive ones of said differentiating means to successive segments of said path.

9. Apparatus for deriving a group of output voltage levels from a serially encoded group of input pulse signals, which comprises a dual conductor transmission line, means for matching said line in its characteristic impedance at each of its extremities, means for applying the input pulse signals at one of said extremities, means for applying setting pulse signals at the other of said extremities, a plurality of paths, each interconnecting the conductors of said line at a distinct one of equal intervals therealong and including the series combination of a voltage-controlled diode and a biasing resistor, said diode displaying a current voltage characteristic with a first region of positive resistance terminated in a threshold and separated from a second region of positive resistance by an intervening negative resistance region, said resistor having a resistive magnitude greater than the minimum of such magnitude identifiable with said intervening region of negative resistance and providing a load line that intersects said characteristic, and means connected to one of said conductors for collectively biasing the diodes to equilibrium voltage levels substantially determined, for each diode, by the intersection of said load line with the first positive resistance region of said characteristic and for simultaneously causing the intersection of said load line with the second positive resistance region of said characteristic, whereby the coincidences of said input signals and said setting pulse signals at various intervals along said line causing the thresholds of the diodes there located to be exceeded result in the setting of those diodes with output voltage levels substantially determined by said intersection of the load line with said second positive resistance region.

10. Apparatus for deriving a parallel encoded group of output pulse signals from a serially encoded group of input pulse signals, which comprises, in combination with apparatus as defined in claim 9, means for applying resetting pulse signals at one of said extremities, a plurality of output paths, respective ones of said paths being connected to respective anodes of said diodes, each of said paths including a capacitor and a delay element connected in series with said capacitor, whereby the occurrence of a resetting pulse signal at the position of the diode that has been set with an output voltage level causes that diode to return to its equilibrium voltage level and provide an output pulse signal on the path connected to its anode.

11. Apparatus for converting a serially encoded group of input pulse signals with a first repetition rate into a delayed and serially encoded group of output pulse signals with a second repetition rate, which comprises, in combination with apparatus as defined in claim 9, means for applying resetting pulse signals at one of said extremities, a delay path with a plurality of taps extending therefrom, said path including between each pair of taps the series combination of a delay element and a rectifying diode, and a plurality of capacitors, respective ones of which interconnect respective ones of said taps with respective anodes of said diodes, whereby the occurrence of a resetting pulse signal at successive positions of diodes that have been set with output voltage levels causes the diodes so set to return to their equilibrium voltage levels and launch on said delay path a serial group of output pulse signals with a repetition rate determined by the adjustments of said delay elements.

12. Apparatus for deriving a group of output signal levels from a group of input pulse signals, which comprises a dual-conductor transmission line, means for matching said line in its characteristic impedance at each of its extremities, means for applying the input pulse signals at one of said extremities, means for applying an auxiliary signal at the other of said extremities, a plurality of negative resistance diodes interconnecting one conductor with the other at distinct intervals along said transmission line, and means, connected to one of said conductors, initially biasing said diodes to one signal level and subsequently biasing each diode at the coincidence position of said input and auxiliary signals to another signal level.

References Cited by the Examiner

UNITED STATES PATENTS

| | | | |
|---|---|---|---|
| 2,593,948 | 4/52 | Wiegand et al. | 328—94 |
| 2,711,526 | 6/55 | Gloess | 340—167 |
| 2,992,339 | 7/61 | Meyers | 307—88.5 |

FOREIGN PATENTS

| | | |
|---|---|---|
| 759,139 | 10/56 | Great Britain. |

MALCOLM A. MORRISON, *Primary Examiner.*

STEPHEN W. CAPELLI, *Examiner.*